June 9, 1953 D. H. TOTH 2,641,717

TRANSISTOR ONE-SHOT MULTIVIBRATOR

Filed Aug. 28, 1952

INVENTOR.
DOLAN H. TOTH

BY Wilson R. Maltby
George Sipkin
ATTORNEY

Patented June 9, 1953 2,641,717

UNITED STATES PATENT OFFICE 2,641,717

TRANSISTOR ONE-SHOT MULTIVIBRATOR

Dolan H. Toth, Spring Lake Park, Minn., assignor, by mesne assignments, to the United States of America as represented by the Secretary of the Navy Application August 28, 1952, Serial No. 306,813

3 Claims. (Cl. 307—38)

Figures 1, 2:
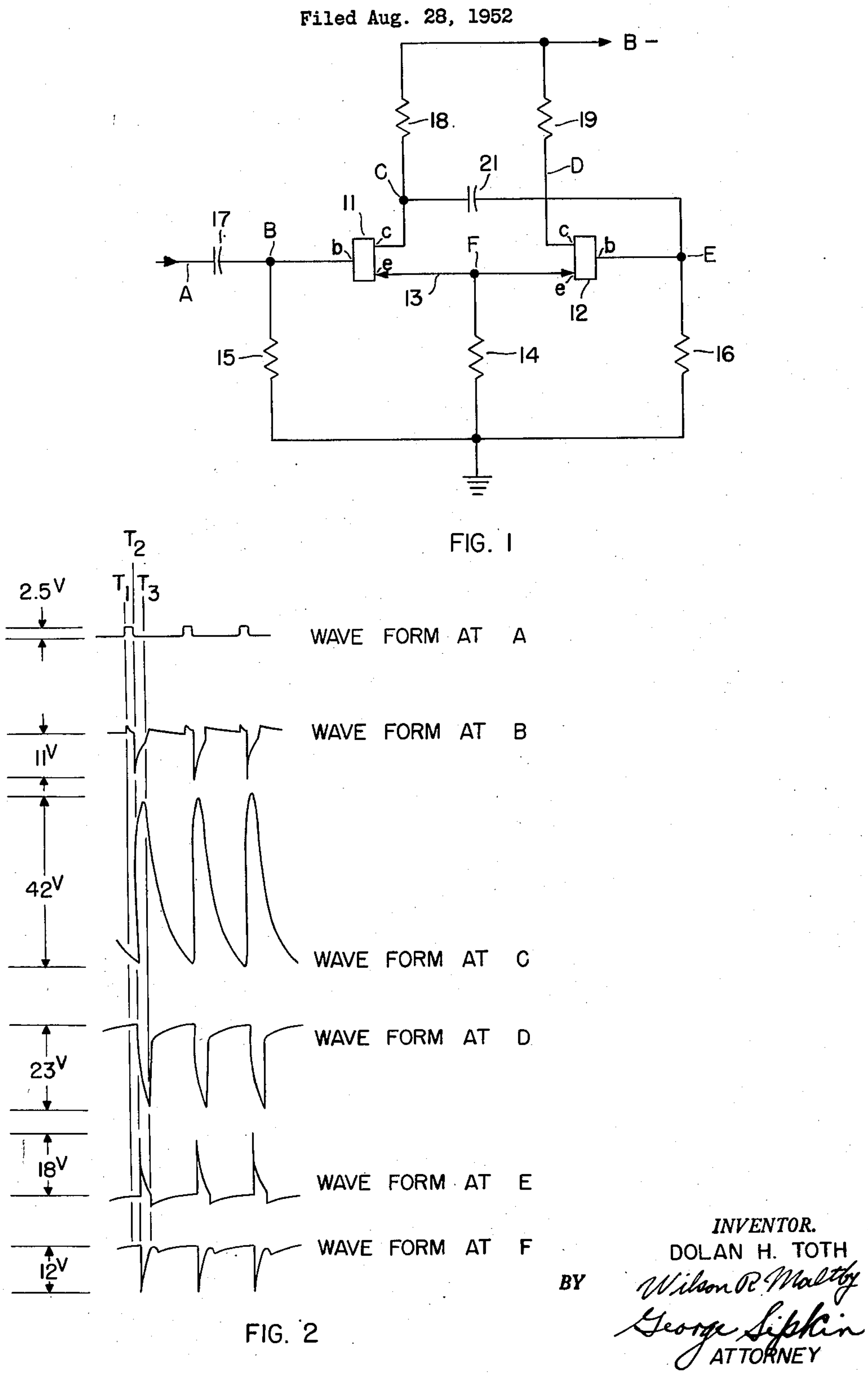

The invention described herein may be manufactured and used by or for the Government of the United States of America for governmental purposes without the payment of any royalties thereon or therefor.

This invention relates primarily to square wave signal generators and particularly to the type of circuit known as a multivibrator in a modified form thereof.

It has previously been proposed to modify the so-called multivibrator to achieve a stable conducting state and a quasi-stable conducting state which latter state exists for an interval of time controlled by an R.-C. circuit. It has also proposed to employ semi-conductor devices in bi-stable multivibrator circuits. The present invention extends the usefulness of the mono-stable, or quasi-stable, type multivibrator for new purposes and uses by incorporation therein of semi-conductor devices to achieve additional stability and to add a further function wherein a negative pulse is directly employed for initiating a single square wave pulse upon receipt of a transient negative signal.

It is accordingly an object of the present invention to provide a single-shot multivibrator of stable and long lasting characteristics. It is a further object to provide a square wave generator of extremely low energy consumption, the output thereof being initiated by a negative voltage pulse.

Other objects and advantages of the invention will hereinafter become more fully apparent from the following description of the annexed drawings, which illustrate a preferred embodiment; and wherein:

Fig. 1 is a schematic wiring diagram of one mode of construction of the invention, and Fig. 2 is a time-voltage diagram illustrating representative voltage relationships at various points in the circuit of Fig. 1.

Referring now to the drawings in which like characters represent like parts and circuit points throughout, 11 indicates a semi-conductor device of the type referred to as a transistor having a base indicated at *b*, an emitter indicated at *e* and a collector indicated at *c*. A transistor may be caused to operate as an amplifier when an input signal is applied to the base electrode and the emitter and collector electrodes are properly biased. An amplifier of this construction has reversal in phase between the base electrode and the collector electrode. Two such amplifiers may be coupled together, with feedback, in such a manner that although only one stable state exists, the condition may be changed into a quasi-stable state by the injection of a pulse into the circuit.

A second transistor 12 is similarly provided with an emitter *e*, a base *b* and a collector *c*. The emitters *e* of 11 and 12 are connected together at 13 and are grounded through resistor 14, which serves as a bias resistor for current flowing through either 11 or 12.

The base *b* of transistor 11 is supplied with a resistor 15 which is also connected to ground, and transistor 12 is similarly supplied with a resistor 16, likewise connected to ground. An input circuit is provided at A which may be pulsed in any suitable fashion with sufficient voltage to initiate conduction in transistor 11 when transistor 12 is conducting. The input circuit is connected to base *b* of transistor 11 at point B through condenser 17, which may be of any suitable size, such, for example as, 600 micromicrofarads, or other value as may be appropriate for the particular constants of the circuit.

The collectors *c* of transistors 11 and 12 are each connected to a power supply through resistors of suitable value, for example, 27,000 ohms, resistor 18 being connected to transistor 11 at C and resistor 19 being connected to transistor 12 at D, the opposite ends thereof being joined at the power supply. It is further noted that the negative terminal of the power supply is selected for energizing the circuit, the positive terminal thereof being grounded, thereby permitting initiation of a cycle of operations of the multivibrator in response to a negative pulse of small value, for example, 2 volts applied at A.

In order to complete the arrangement as a mono-stable multivibrator, a condenser 21 is connected between transistor 11 and the collector resistance supplying energization thereto as at C, the other side of condenser 21 being connected to ground through resistor 16 and to the base of transistor 12 as at E forming a C.-R. circuit between C and ground.

The circuit, as hereinbefore described, operates in the following manner. When the circuit is energized current begins flowing through the parallel paths including the collector resistances, the collectors, the emitters and the common emitter resistor 14, to ground. However, conduction is unstable in one of the two transistors when connected as described, in this case current tending to fall off in transistor 11 while increasing in transistor 12 until transistor 12 assumes the entire current, promptly upon energization. Therefore, with transistor 11 cut off, and at stable operating condition of the device, a time-cycle beginning at $T_0$ may be assumed. A pulse is illustrated as being supplied at A and at $T_1$, this pulse being of positive sign and presumably of short duration extending to $T_2$. One of the typical uses of the circuit employs a simple sharp negative pulse at $T_2$ in place of the illustrated positive pulse terminating at $T_2$, with an identical cycle initiated thereby. A charge then occurs on condenser 17 which gradually leaks off through resistor 17. At $T_2$ the positive current pulse is illustrated as terminating and, because of the leak-off of charge from condenser 17, results in a negative voltage pulse at B of Fig. 1, thereby biasing transistor 11 to a conducting condition. In accordance with the amplification constant, an increased voltage signal, for example, 42 volts will occur at C and will be passed by condenser 21 to point E. It will be observed from Fig. 2 that the voltage variation at B is greater than that of the applied signal, in accordance with observed performance of semi-conductor devices of this type. As the collector of transistor 11 goes positive, this voltage change is passed to the base of transistor 12, by way of condenser 21 and junction E. This voltage change biases transistor 12 to cutoff. The wave form is shown at E of Fig. 2. Transistor 12 remains in the cutoff condition until the charge on condenser 21 has leaked off to ground by way of resistor 16 and in parallel therewith through transistor 12 and resistor 14 to ground. As soon as the voltage on condenser 21 is reduced sufficiently to permit transistor 12 to resume conduction, transistor 11 is forced out of conduction by the condition initially applying at time $T_0$. The interval between $T_2$ and $T_3$ is thus the interval of conduction in transistor 11 and corresponds to the quasi-stable state. At $T_3$ the initial stable condition is reestablished with transistor 12 fully conducting and transistor 11 cut off. The circuit remains in this condition until again excited by a negative pulse effectively applied at the base of transistor 11.

The foregoing circuit is somewhat similar to a one-shot multivibrator employing vacuum tube triodes, but is seen to be different in several respects and not fully analogous, the vacuum tube circuit for this purpose employing the grids for initiating conduction, the grids being in circuit at the locations of the bases of the transistors therein employed. For some purposes transistors have been heretofore employed in place of vacuum tube triodes in which the emitter of the transistor is analogous to the grid of the vacuum tube, the base becoming the cathode and collector the anode.

The quasi-stable circuit herein shown and described is more stable and more reliable, consumes only a small percentage of power, and is much smaller in dimensions than a corresponding circuit built up with vacuum tubes.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A multivibrator circuit comprising an input circuit including a condenser and a resistive connection therefrom to ground, a transistor comprising a collector, base and emitter, the base being connected to said input circuit, said collector being connected through a load resistor to a power supply negative terminal, a second similar transistor having the collector thereof connected through a similar load resistor to said power supply and having the base thereof connected to ground through a resistor similar to said input circuit resistor and having the base thereof connected to the collector of first said transistor through a capacitor variable to set a time-constant, said transistors having the emitters thereof joined electrically and connected to ground through a common resistive path.

2. A mono-stable multivibrator circuit comprising a power supply grounded at one terminal thereof, a pair of transistors, each having a base, emitter and collector, and connected at the emitters thereof through a common resistor to ground, and at the collectors thereof through respective similar resistors to the opposite terminal of said power supply, an input circuit including a condenser series-connected to the base of one said transistor and a resistor connected from said base to ground, a C-R circuit connected between the collector of said one transistor and ground, said C-R circuit including a condenser in series with a resistor, the junction thereof being joined to the base of the other said transistor, whereby said other transistor is stably conducting and said one transistor is quasi-stably conducting when conduction therein is initiated by a negative input signal.

3. A high frequency pulse amplifying circuit comprising a power supply grounded at one of two terminals thereof, capacitive coupling means for supplying a pulse to said circuit, a pair of current amplifying transistors connected together at the emitters thereof and having the collectors thereof severally connected through similar resistors to the ungrounded terminal of said power supply, said emitters being connected to ground through a common resistor, and the base of one said transistor being connected through a capacitance to the collector of the other transistor and to ground through a resistor, whereby stable conduction is effected in said one transistor, said other transistor effecting amplification of said pulse.

DOLAN H. TOTH.

No references cited.